Feb. 23, 1926.
H. J. WINN
INCUBATOR THERMOMETER
Filed August 20, 1924
1,574,413
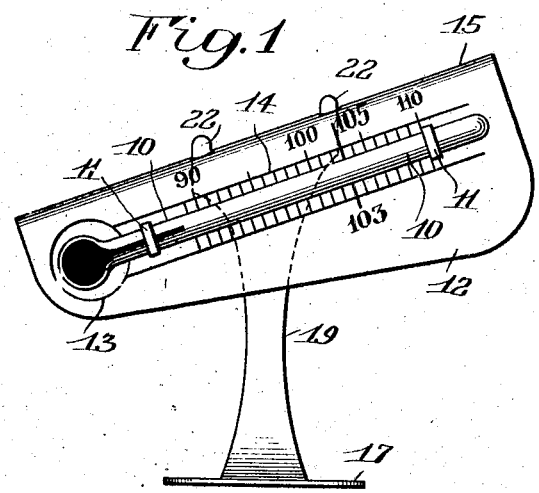
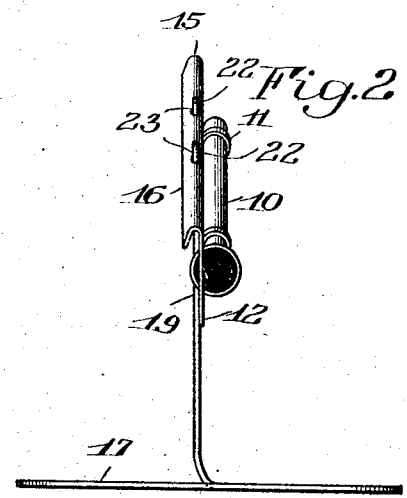
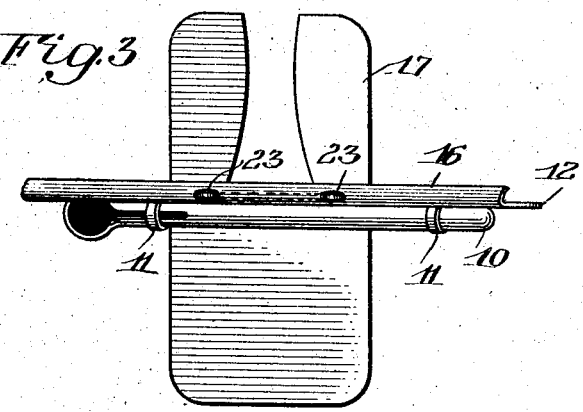
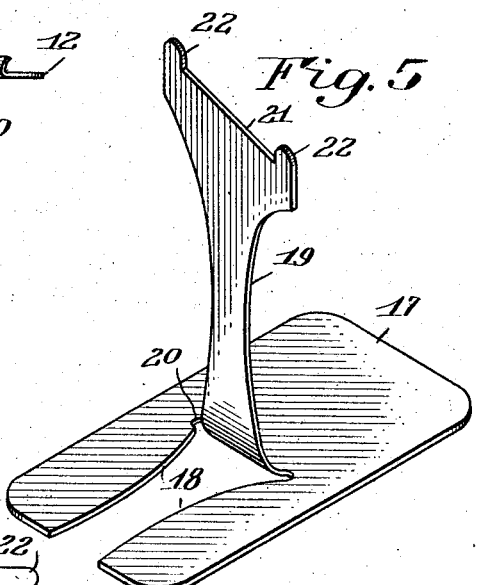
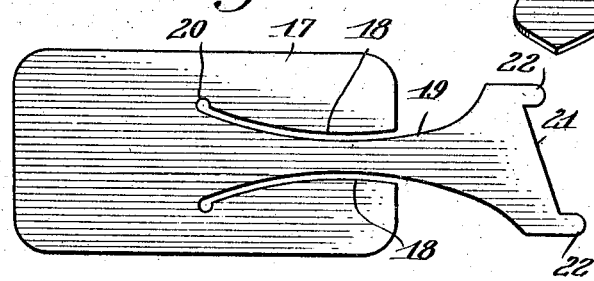
INVENTOR.
Herbert J. Winn
BY Frederick F. Church
his ATTORNEY Patented Feb. 23, 1926.

1,574,413

UNITED STATES PATENT OFFICE.

HERBERT J. WINN, OF ROCHESTER, NEW YORK, ASSIGNOR TO TAYLOR INSTRUMENT COMPANIES, OF ROCHESTER, NEW YORK, A CORPORATION OF NEW YORK.

INCUBATOR THERMOMETER.

Application filed August 20, 1924. Serial No. 733,100.

*To all whom it may concern:*

Be it known that I, HERBERT J. WINN, a citizen of the United States, residing at Rochester, in the county of Monroe and State of New York, have invented certain new and useful Improvements in Incubator Thermometers; and I do hereby declare the following to be a full, clear, and exact description of the same, reference being had to the accompanying drawings, forming a part of this specification, and to the reference numerals marked thereon.

This invention relates to thermometers and, more particularly, to the variety adapted for use in incubators and the like, one object of the invention being to provide a thermometer of this character comprising simple, practical and inexpensive means for supporting the same in reading position on a surface such as the floor or a tray of the incubator. A further object is to provide such a thermometer having a simple and inexpensive supporting means or standard capable of being compactly arranged for storage or shipment and of being conveniently adjusted for use to detachably support the thermometer in a readily visible position.

To these and other ends the invention resides in certain improvements and combinations of parts, all as will be hereinafter more fully described, the novel features being pointed out in the claims at the end of the specification.

In the drawings:

Figure 1 is a front elevation of a thermometer embodying the present invention with the parts arranged as in use;

Figure 2 is an elevation of the same as viewed from the left in Figure 1;

Figure 3 is a top plan view of the same;

Figure 4 is a plan view of the supporting means or standard arranged for storage or shipment, and Figure 5 is a perspective view of the same arranged for use as in Figure 1.

Similar reference numerals throughout the several views indicate the same parts.

The invention is embodied in the present instance in an incubator type thermometer mounted on a plate marked, adjacent the thermometer stem, with a suitable scale and adapted to be detachably positioned on an advantageously simple form of standard for supporting the same on the floor or a tray of the incubator with the thermometer and its mounting disposed at the preferred inclination and so as to be clearly visible from the exterior of the incubator casing.

Referring more particularly to the drawings, there is shown at 10 an incubator type of thermometer comprising a glass bulb and stem supplied with an expanding fluid, the stem being secured as by means of straps 11 on a mounting plate 12. The latter is preferably formed with an opening 13 in which the thermometer bulb is received and protected. The plate is marked along the thermometer stem with a suitable scale as indicated at 14. The upper side or edge of the mounting plate is folded as at 15 to provide an angular flange 16 for supporting the same, as hereafter described.

It has been found that a thermometer and mounting such as described above may have advantageously combined therewith an exceedingly simple and inexpensive form of support or standard adapted to have its parts conveniently arranged for detachably and securely supporting the thermometer and mounting on a surface such as an incubator tray or compactly folded into a flat condition in a plane, so that the whole instrument may be advantageously disposed in small space, as in a small container, for storage or shipment.

Such supporting means or standard is preferably formed from a one-piece blank 17 of sheet metal, best shown in Figure 4, which is slitted inwardly from one edge as at 18 to form a strip 19, the inner ends of the slits being enlarged as at 20 so that strip 19 may be readily bent upwardly to afford a standard rising vertically from the main portion of the blank 17 as a base. The outer end or top of standard strip 19 is preferably formed as shown with a supporting abutment means or edge portion 21 for engagement under the mounting plate flange 16 to support the thermometer. This edge portion is preferably inclined as shown to dispose the thermometer at the desired inclination and is provided at either end with a lug 22 adapted to be engaged in spaced openings 23 in flange 16 to detachably retain the mounting plate in position. The latter may thus be readily positioned on and removed from the standard as convenient when it is desired to otherwise dispose the thermometer as to lay the same directly on a supporting surface. The thermometer and its mounting may also be thus readily detached for compact storage or shipment as hereafter described.

The sheet material of which the supporting standard is constructed is preferably of such gauge as to render standard strip 19 readily flexible by hand so that it may be bent upwardly as described for use, and bent down again into the plane of the base 17 to thus dispose all of the parts of the standard in a plane or flat condition. In such arrangement the standard and the thermometer and mounting plate may be laid one upon another in a comparatively small space as in a small container, for safe storage or shipment. In addition to the above advantages the standard is inexpensive to manufacture and presents a neat appearance in use.

I claim as my invention:

1. In an incubator thermometer, the combination of a thermometer tube, a plate on which said tube is mounted having at one lateral margin an angular flange provided with an aperture, and a standard comprising abutment means and a lug for engagement with said flange and aperture respectively to detachably support said mounting plate and tube in reading position.

2. In an incubator thermometer, the combination of a thermometer tube, a plate on which said tube is mounted having at one lateral margin an angular flange provided with spaced apertures, and a standard provided at its top with an abutment for engagement under said flange and with upwardly projecting lugs at the ends of said abutment for engagement in said apertures to detachably support said mounting plate and tube in reading position.

3. In an incubator thermometer, the combination of a thermometer tube, a plate on which said tube is mounted having at one lateral margin an angular flange provided with an aperture, and a standard comprising a sheet metal blank formed to provide a base and an upwardly turned standard strip having at its top an abutment edge and a lug for engagement with said plate flange and aperture respectively to detachably support said mounting plate and tube in reading position.

4. In an incubator thermometer, the combination of a thermometer tube, a plate on which said tube is mounted having along one lateral edge thereof an angularly turned flange provided with an aperture, and a support formed from a sheet metal blank comprising a base portion with slits extending inwardly from an edge thereof to provide a standard strip turned upwardly and having at its top an abutment edge and a lug for detachable supporting engagement with said flange and apertures respectively.

5. In an incubator thermometer, the combination of a thermometer tube, a plate on which said tube is mounted having an edge thereof turned to form a flange provided with spaced apertures and a support formed from a flexible sheet metal blank comprising a base portion slit inwardly from an edge thereof to provide a standard strip turned upwardly and having at its top an inclined edge with lugs at the ends thereof for engagement respectively with said plate flange and apertures to detachably support said mounting plate and tube in reading position.

HERBERT J. WINN.